United States Patent
Adduci

(10) Patent No.: US 6,547,586 B2
(45) Date of Patent: Apr. 15, 2003

(54) SEALED ELECTRICAL DISTRIBUTION CENTER

(75) Inventor: Robert Louis Adduci, Hubbard, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/855,010

(22) Filed: May 14, 2001

(65) Prior Publication Data

US 2002/0168889 A1 Nov. 14, 2002

(51) Int. Cl.[7] .................................................. H01R 4/24
(52) U.S. Cl. ........................ 439/426; 439/272; 439/949
(58) Field of Search ................................ 439/426, 587, 439/272, 949

(56) References Cited

U.S. PATENT DOCUMENTS

| | | | | | |
|---|---|---|---|---|---|
| 3,571,779 A | * | 3/1971 | Collier | ........................ | 439/426 |
| 3,818,415 A | * | 6/1974 | Evans et al. | ................ | 439/426 |
| 4,230,385 A | * | 10/1980 | Ammon et al. | ............. | 439/426 |
| 4,802,869 A | * | 2/1989 | Maue | .......................... | 439/589 |
| 4,824,390 A | * | 4/1989 | Crane et al. | ................. | 439/426 |
| 5,312,265 A | * | 5/1994 | Fiori et al. | ................... | 439/426 |
| 5,709,567 A | * | 1/1998 | Gladd et al. | ................. | 439/444 |
| 5,933,018 A | * | 8/1999 | Komatsu | ...................... | 439/67 |
| 6,008,982 A | * | 12/1999 | Smith | ........................ | 439/76.2 |
| 6,126,457 A | * | 10/2000 | Smith et al. | ................ | 439/76.2 |

* cited by examiner

Primary Examiner—Renee Luebke
Assistant Examiner—Briggitte R. Hammond
(74) Attorney, Agent, or Firm—Thomas N. Twomey

(57) ABSTRACT

A sealing member for use in an electrical distribution center has a housing overlain by a terminal connector body. The connector body has a plurality of cavities. Terminals project from the housing into the cavities through an inner surface of the connector body. The sealing member is interposed between the housing and the connector body and seals around each of the terminals and against the inner surface of the connector body around each of the cavities. The sealing member has a substrate layer covered on both sides by layers of silicone rubber. Cable terminals are adapted to be inserted into the cavities through an outer surface of the connector body to make electrical contact with the terminals projecting from the housing.

2 Claims, 3 Drawing Sheets

SEALED ELECTRICAL DISTRIBUTION CENTER

This invention relates generally to electrical distribution centers and more particularly to a sealed electrical distribution center.

BACKGROUND OF THE INVENTION

Electrical distribution centers are widely used in motor vehicles. Electrical distribution centers serve to connect a power source to electrical wiring harnesses for supplying power and control signals to various electrical systems of the vehicle. An electrical distribution center has a circuit board interposed between an upper housing and a lower housing. Terminals from the circuit board project from the lower housing into selected cavities in a connector where such terminals make electrical contact with cable terminals leading to the various electrical systems. Often the electrical distribution centers and their mating connectors are unsealed, even in underhood installations. However, while unsealed electrical distribution centers may be acceptable for certain high energy power circuits, they should be sealed particularly when used to supply low energy control signals to various electrical systems.

SUMMARY OF THE INVENTION

In accordance with the present invention, a seal is provided between the electrical distribution center and the connector. The seal prevents foreign matter from entering into the electrical distribution center, and also forms seals around each of the terminals projecting from the electrical distribution center and around each of the cavities in the connector, and also provides a peripheral seal around the electrical distribution center and around the connector.

The seal is provided by a sealing member interposed between the electrical distribution center and the connector. Preferably the sealing member includes layers of sealing material on opposite sides of a substrate layer. The substrate layer is preformed with holes for receiving the terminals projecting from the electrical center. The layers of sealing material initially cover the holes. In the process of projecting through the holes, the terminals pierce the layers of sealing material. The pierced sealing material seals around the terminals. Holes not entered by a terminal remain covered by the sealing material. In the embodiment about to be described, the substrate layer is a sheet of Mylar and the sealing material is silicone rubber.

While the sealing member of this invention is shown in the drawings as being placed between an electrical distribution center and a harness connector, it may be used inside the electrical distribution center housing, or in any electrical system having terminals.

One object of this invention is to provide a sealed electric distribution center having the foregoing features and capabilities.

Other objects, features and advantages of the invention will become more apparent as the following description proceeds, especially when considered with the accompanying claims and drawings.

DETAILED DESCRIPTION OF THE PREFERRED EMBODIMENT

Figure 1:
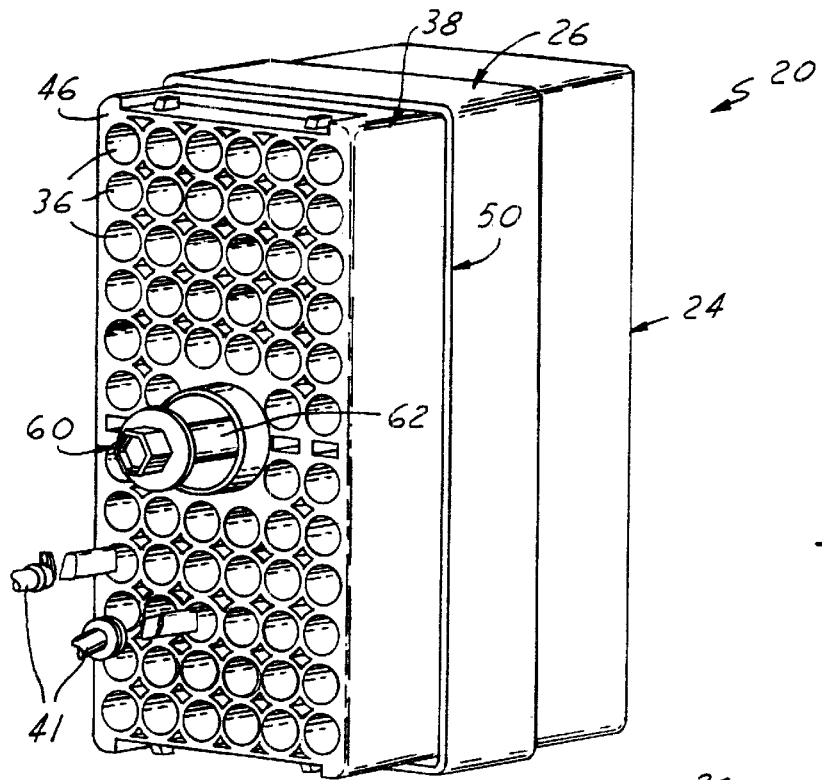
FIG. 1 is a perspective view of an electrical distribution center and connector, constructed in accordance with this invention.
Figure 2:
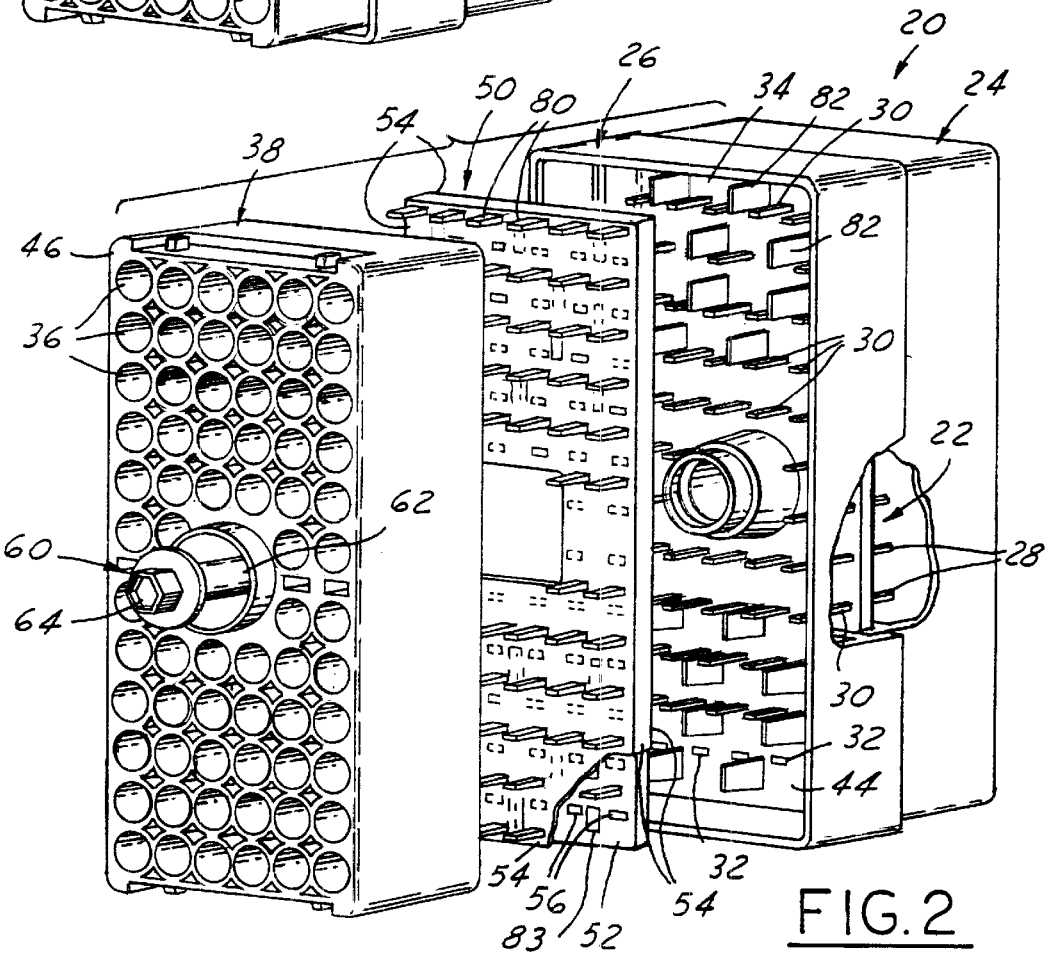
FIG. 2 is an exploded, perspective view of the electrical distribution center and connector shown in FIG. 1, and also showing a sealing member embodying the invention between the electrical distribution center and the connector.
Figure 3:
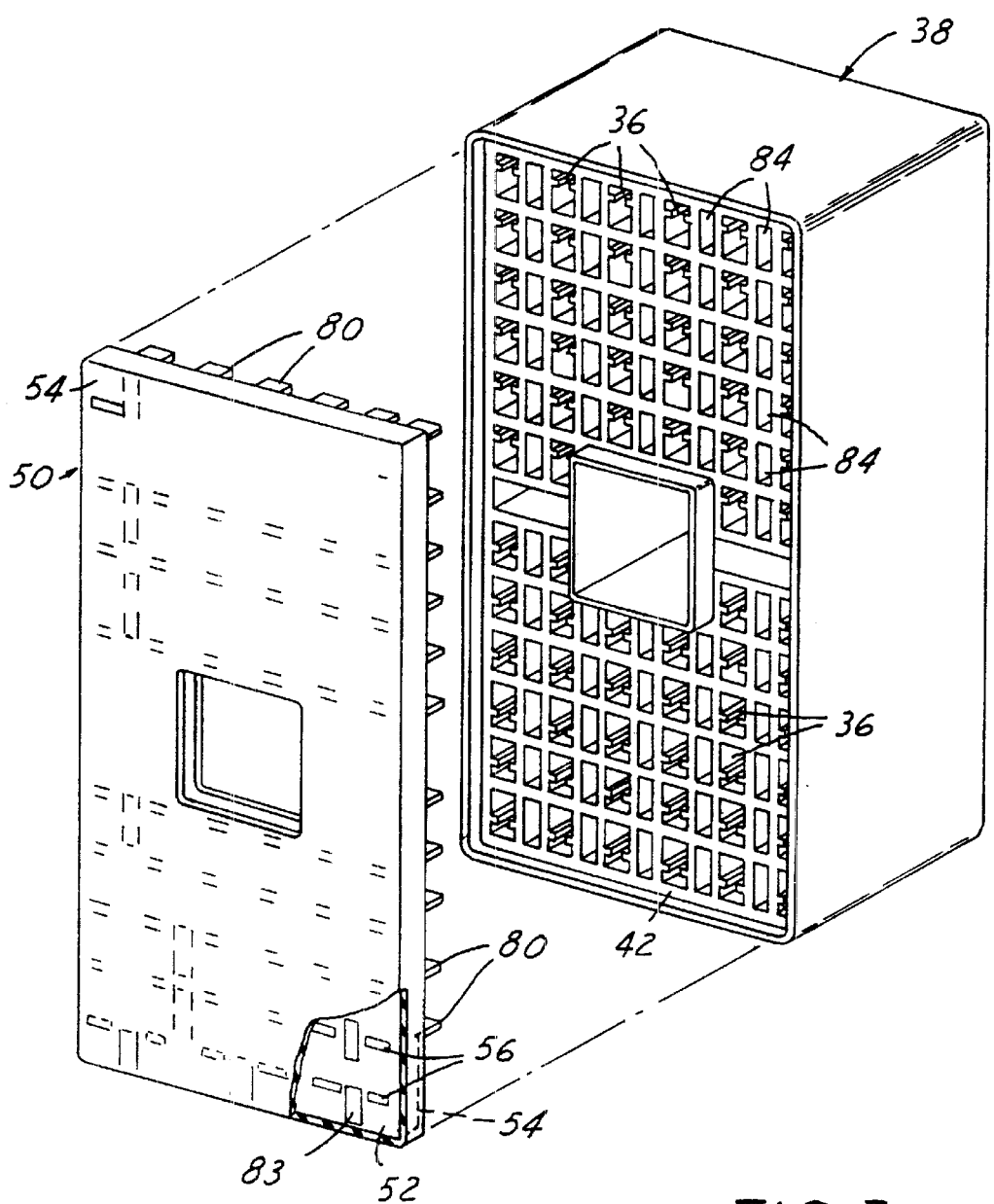
FIG. 3 is an exploded, perspective view of the connector and sealing member, showing the sides thereof opposite the sides shown in FIG. 2.

Referring now more particularly to the drawings especially to FIGS. 1–3), an electrical distribution center 20 is shown having a circuit board 22 between an upper housing 24 and a lower housing 26.

The circuit board 22 has a multiplicity of terminals 28, each terminal having a blade 30 extending downwardly from the circuit board through holes 32 in the flat bottom wall 34 of the lower housing 26. The terminals 28 are connected to a power source (not shown). The blades 30 project into cavities 36 in a connector body 38 for contact with terminals 40 on the ends of cables 41. The cables 41 are adapted to transmit power and control signals to various electrical systems of a vehicle.

The connector body 38 has a flat inner surface 42 opposed to the flat bottom wall 34 of the lower housing 26. The cavities 36 in the connector body 38 are in the form of elongated, parallel passages which extend entirely through the connector body, opening through the flat inner surface 42 of the connector body and through an outer surface 46 thereof.

A sealing member 50 is interposed between the flat bottom wall 34 of the lower housing 26 and the flat inner surface 42 of the connector body 38. The sealing member 50 preferably has a substrate layer 52 in the form of a flexible, relatively thin, sheet of a suitable plastic such as Mylar, which is a name for a film made from the polyester of ethylene glycol and terephthalic acid. The Mylar sheet is coated with a layer 54 of sealing material on both of its opposite sides so that the substrate layer 52 is completely encapsulated by the sealing material. The layers 54 of sealing material are preferably silicone rubber but may be other materials, preferably elastomeric, capable of sealing against the intrusion of water or foreign matter into the electrical distribution center 20.

The substrate layer 52 has preformed holes 56 respectively aligned with the cavities 36 in the connector body 38. The layers 54 of sealing material initially cover the holes 56. The terminal blades 30 from the circuit board 22 project through the holes 56 in the substrate layer 52 of the sealing member 50. In the process of projecting through the holes 56, the blades 30 pierce through the layers 54 of sealing material, and extend into the cavities 36 in the connector body 38. The pierced layers 54 of sealing material seal around the blades 30. Holes 56 which are not entered by a terminal blade 30, because of the absence of a terminal blade at that position, remain sealed by the sealing material overmold which will not be pierced.

A fastener assembly 60 includes a headed bolt 62, which extends through aligned holes in the lower housing 26, sealing member 50 and connector body 38, and a nut 64 which is threaded on the bolt and compresses the sealing member 50 between the lower housing 26 and the connector body 38 and secures them firmly together. The layers 54 of sealing material seal against the bottom wall 34 of the lower housing 26, against the inner surface 42 of the connector body 38, around the cavities 36 in the connector body, and around the terminal blades 30.

The cable terminals 40 extend into the cavities 36 through the outer surface 46 of the connector body 38, and have flexible ends 67 making electrical contact with the blades 30. The cable terminals 40 may have ring seals 70 which extend into and seal against the walls of the cavities 36 in the connector body 38.

The outer margins of the layers of sealing material 54 of the sealing member 50 provide a peripheral seal around the bottom wall 34 of the lower housing 26 and around the inner surface 42 of the connector body 38, encompassing all of the cavities 36 in the connector body. Therefore contaminants are excluded from the electrical distribution center 20 and from the connector body 38. Contaminants that may enter one of the cavities 36 through the outer surface 46 of the connector body 38 will not migrate to the other cavities across the inner surface 42 of the connector body because the sealing layers 54 of the sealing member 50 seal against the inner surface 42 of the connector body 38 around each of the cavities and also seals around each of the blades 30. Thus, if one of the cable terminals 40 is unsealed, that is, does not have a seal 70, contaminants including water and foreign matter may enter the cavity into which that unsealed terminal extends, but such contaminants will not enter adjacent cavities in which sealed cable terminals have been inserted.

Figure 4:
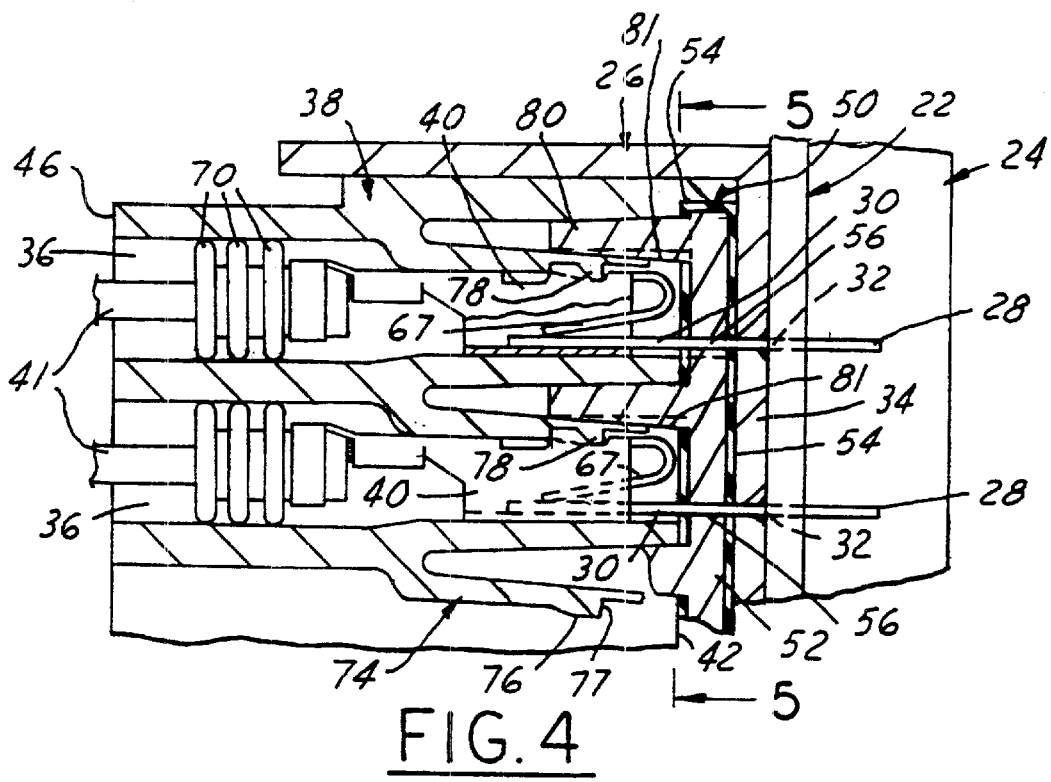
FIG. 4 is a fragmentary sectional view of a portion of the electrical distribution center, connector and sealing member, taken on the line 4—4 in FIG. 5.
Figure 5:
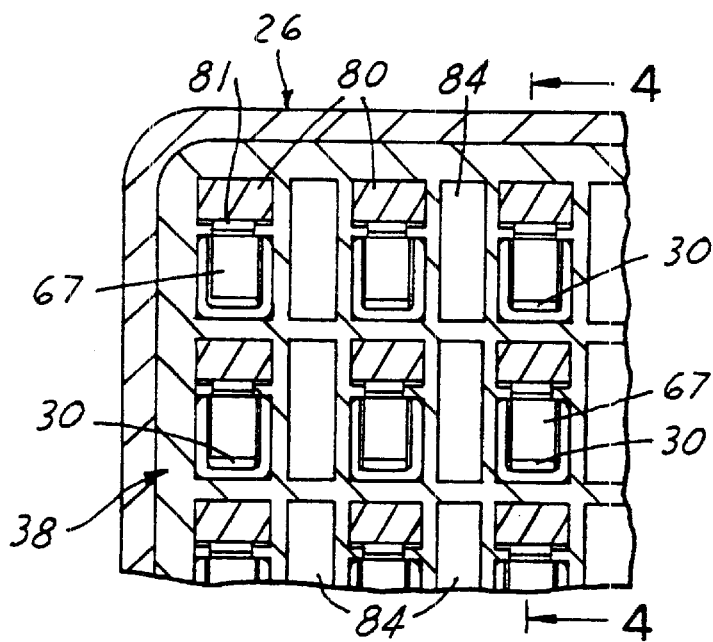
FIG. 5 is a fragmentary, sectional view taken on the line 5—5 in FIG. 4.

Each of the cavities 36 in the connector body 38 has a terminal lock 74 (FIG. 4). Each terminal lock 74 has a flexible, resilient, locking finger 76 extending lengthwise of the cavity and secured at one end to the connector body 38. The free end of the locking finger 76 of the terminal lock 74 has a hook 77 which is adapted to engage a catch 78 on the cable terminal 40 when the terminal 40 is inserted into a cavity 36 through the outer surface 46 of the connector body. When thus inserted, the catch 78 on the cable terminal will cam past the locking finger 76, causing the free end of the locking finger to flex away and then snap into locking engagement with the catch 78, to retain the cable terminal 40 from being withdrawn.

The bottom wall 34 of the lower housing 26 has integral locating prongs 82 extending through slots 83 in the substrate 52 of the sealing member 50 and through the sealing material 54 on opposite sides of the substrate 52, into slots 84 in the connector body 38 to properly locate the sealing member 50 relative to the connector body.

What is claimed is:

1. In an electrical distribution, a housing, a terminal connector body overlying said housing, said connector body having a plurality of cavities therein opening through an inner surface thereof, a plurality of terminals projecting from said housing into said cavities through the inner surface of said connector body, and a sealing member interposed between said housing and said connector body through which said terminals extend, said sealing member sealing around each of said terminals and against said inner surface of said connector body around each of said cavities, said sealing member comprising a substrate with openings for receiving of the terminals, said substrate being encapsulated in sealing material which covers said openings but is being capable of being pierced by and sealing around any of the terminals which may project through at least some of the openings, any opening not receiving terminals remaining covered by the sealing material, and wherein said sealing material is silicone rubber formed in layers on opposite sides of said substrate.

2. An electrical distribution center as defined in claim 1, wherein said substrate is a layer of Mylar.

* * * * *